(12) United States Patent
Basile et al.

(10) Patent No.: US 6,337,033 B2
(45) Date of Patent: *Jan. 8, 2002

(54) REFRIGERATING COMPOSITIONS BASED ON FLUOROETHERS AND DIFLUOROMETHANE

(75) Inventors: Giampiero Basile; Ezio Musso; Sauro Girolomoni, all of Alessandria (IT)

(73) Assignee: Ausimont, S.p.A., Milan (IT)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/112,345

(22) Filed: Jul. 9, 1998

(30) Foreign Application Priority Data

Jul. 11, 1997 (IT) .......................... MI97A1653

(51) Int. Cl.[7] .................................. C09K 5/04
(52) U.S. Cl. ..................... 252/68; 252/67; 510/411
(58) Field of Search ................ 252/67, 68; 510/411

(56) References Cited

U.S. PATENT DOCUMENTS 5,021,179 A * 6/1991 Zehler et al.
5,096,606 A * 3/1992 Hagihara et al.
5,605,882 A 2/1997 Klug et al. .................. 510/411
5,954,995 A * 9/1999 Goble

FOREIGN PATENT DOCUMENTS

| EP | 738772 | 3/1996 |
| EP | 738773 | 3/1996 |
| EP | 0 738 772 A1 | 10/1996 |
| EP | 0 738 773 A1 | 10/1996 |
| WO | 93/14174 | 7/1993 |
| WO | WO 93/14174 | 7/1993 |

OTHER PUBLICATIONS

D.A. Didion e D.B. Bivens "Role of refrigerant mixtures as alternatives to CFCs" in Int. J. of Refrigeration (vol. 13, p. 163), May 1990.

* cited by examiner

*Primary Examiner*—Margaret Einsmann
(74) *Attorney, Agent, or Firm*—Arent Fox Kintner Plotkin & Kahn, PLLC

(57) ABSTRACT

Azeotropic or near-azeotropic composition essentially consisting of:
 35–99.1% by weight of $CH_2F_2$ (R 32), difluoromethane,
 0.1–65% by weight of $CHF_2-O-CF_3$, 1,1,1,2,2,-pentafluorodimethylether.

1 Claim, 1 Drawing Sheet

CALCULATED COP FOR THE R32/RE125 COMPOSITIONS

CALCULATED VOLUMETRIC CAPACITY
R32/RE125 COMPOSITIONS

REFRIGERATING COMPOSITIONS BASED ON FLUOROETHERS AND DIFLUOROMETHANE

The present invention relates to hydrofluorocarbons (HFC) based compositions as substitutes of $CHClF_2$ (R 22). More particularly it relates to azeotropic compositions containing R 32 (difluoromethane, $CH_2F_2$) and ether of R 125 ($CHF_2$—$CF_3$) known as RE 125 (1,1,1,2,2-pentafluorodimethylether, $CHF_2$—O—$CF_3$). Said compositions are very good working fluids for environmental air-conditioning plants and heat pumps.

R 22 is widely used as working fluid in room air-climatization. It is known, the R 22 being an HCFC, that it is subjected to production and use regulation and that therefore it will not be used any longer in the future.

The problem of the substitution of the CFCs as non dangerous refrigerants for the stratospheric ozone layer is well known. While for bringing to an end this substitution the HCFCs have been made available as transition fluids less dangerous than CFCs, their use is however regulated and this fact has caused many studies towards the definitive setting-up of new completely harmless fluids towards the stratospheric ozone layer. It is a characteristic of these latter fluids completely harmless towards the stratospheric ozone layer, not to contain chlorine atoms in their molecule and not to be usable in the area of the present equipments but to be usable in the area of the new ones or of the present equipments modified if necessary and working with different lubricants, for instance based on POE (polyols esters).

The substitution of R 22 with substitutes having the same characteristics, compatibility and performances has resulted among the most difficult ones among those up to now faced in the refrigeration field and it has not so far a viable solution.

In the case of the plants for home environmental air-conditioning and working by vapour compression cycles there is the possibility to use the same fluid both for cooling and for heating: this is possible with R 22. It is well known that by vapour compression cycle it is meant a refrigerating plant which takes advantage from the changes of physical state of the refrigerant which are finalized to remove heat from one side, during evaporation, and to release it to the other side, during condensation, thus obtaining a continuous heat transfer. The cycle is maintained at the expense of the required energy to compress the vapour.

The main characteristics of a working fluid in the mentioned application fields and generally in the whole field of the refrigeration and air-conditioning are well known:

easy to use,
reliability
chemical stability,
no toxicity,
suitable performances.

By suitable performances it is meant not only that the new fluid must be sufficiently effective from the point of view of the energetic consumptions and have a sufficient capacity of generating cool or releasing heat but also that, towards the fluid to be substituted, it does not require substantial modifications of the equipment design which must contain it and the change of the lubricating oil. Generally when a fluid has these characteristics it is called drop in.

By inertia and chemical stability it is meant that at the use pressures and temperatures alone or in the presence of lubricants and metals, air and moisture optionally absorbed, the refrigerant fluid does not undergo chemical degradation or variation of its performances.

The fluid even though it can be released in the environment because of small or great leaks of accidental type or of maintenance operations, being atoxic, guarantees the operator and final utilizer safety. By fluid compatible with the environment it is meant that it is completely inert towards the stratospheric ozone layer (ODP=0) and that it preferably has a small global warming power and any way lower than that it must replace (low GWP). By use easiness and reliability it is meant to refer to all those cases in which the fluid is not based on only one component but on more components. In all cases of multicomponent blends it is necessary to point out in which extent their characteristic may have influence during their handling and during their running in the plant. Indeed, depending on the chemical-physical properties of the fluid mixture, the storage, drawing, transfer and filling up phases of the refrigerating plant will be able to assure the nominal composition of the fluid in a more or less extended way. In other words some of the chemical-physical properties particularly affect the so called easy to use feature. By reliability it is meant a quite similar fact to this and which consists in assuring that during every kind of accidental or maintenance leak the fluid does not change its nominal composition and does not transform itself into compositions with different performances from the initial ones.

Easy to use feature and reliability of a refrigerant depend on the fact that among the chemical-physical properties of the refrigerant there is that to be an azeotrope.

By performances of a refrigerant fluid are meant known terms and especially two: COP (coefficient of performance) and Volumetric Capacity. By COP, which can indifferently be referred to a refrigerating cycle or heat pump, it is meant the energy given back from the fluid under the form of cold or heat with respect to that consumed in the compression. By Volumetric Capacity it is meant to indifferently refer to the cold or heat developed by volume unit of compressed fluid.

The need was felt to have available a refrigerant fluid having the combination of the above properties as substitute of R 22, in particular having the essential characteristic to be an azeotrope or near-azeotrope (as defined below), having COP and Volumetric Capacities similar or higher than R 22.

An object of the present invention is an azeotropic or near-azeotropic composition essentially consisting of:

35–99.1% by weight of $CH_2F_2$ (R 32), difluoromethane
0.1–65% by weight of $CHF_2$—O—$CF_3$ (RE 125), 1,1,1,2,2,-pentafluorodimethylether.

In particular the azeotropic composition is the following:
90% by weight of $CH_2F_2$ (R 32), difluoromethane
10% by weight of RE 125, 1,1,1,2,2,-pentafluorodimethylether.

The compositions in the above range excluding the azeotrope are characterized in being near-azeotropic, i.e., after evaporation at constant temperature of 50% by weight of the initial mass of the liquid, the percent variation of the vapour pressure between the initial and final composition results to be lower than about 10%.

As well known an azeotrope is a specific mixture which has singular, unexpected and unforeseable chemical-physical properties, of which the most important ones are reported hereinafter. An azeotrope is a mixture of two or more fluids which has the same composition in the vapour and in the liquid phase, when it is in equilibrium under specific conditions. The azeotropic composition is defined by particular temperature and pressure values; under these conditions the mixtures undergo phase changes at constant composition and temperature as they were pure compounds.

A near-azeotropic blend is a mixture of two or more fluids which has a composition of the vapour substantially identical to that of the liquid and undergoes phase changes without substantially modifying its composition and temperature.

Generally in the prior art a composition is defined near-azeotropic as follows: after evaporation at constant temperature of 50% by weight of the liquid initial mass, the percent variation of the vapour pressure between that of the initial and that of the final composition results to be lower than about 10% as above described (to this purpose see the paper of D. A. Didion e D. B. Bivens in Int.J. Of Refrigeration, (vol.13, pag 163, 1990).

In the case of an azeotrope no variation of the vapour pressure between that of the original composition and that obtained after evaporation of the 50% of the liquid, is noted.

The azeotropic or near-azeotropic mixtures fall within the cases showing sufficiently positive or negative deviations from the Raoult's law valid for ideally behaving systems.

Deviations with respect to the ideality are caused by unexpected and unforeseeable intermolecular interactions among the components of the binary or ternary system such as to generate higher or lower interactions than those existing among the molecules of the pure products. When such deviations are sufficiently marked, the vapour pressure of the mixture in the azeotropic point is characterized by either lower or higher values than that of the pure components. Always for the azeotropic composition it is clear that, if the vapour pressure curve of the mixture shows a maximum, this corresponds to a minimum of the boiling temperature; viceversa to a minimum value of the vapour pressure it corresponds a maximum of the boiling temperature.

The azeotropic mixture admits only one composition for each value of the temperature and the pressure.

However, by changing temperature and pressure, several different azeotropic compositions starting from the same components can be obtained.

For instance the combination of all the compositions of the same components which have an absolute minimum or a maximum in the boilig temperature at different pressure levels form a range of compositions all azeotropic.

By boiling point at a certain pressure or bubble point it is meant, in the case of the mixtures of two or more components, the temperature at which the liquid mixture begins to form the first bubbles of its vapour. It is known in the art that such temperature can rise during isobar evaporation up to the moment in which the liquid is completely evaporated: this latter end boiling temperature is generally higher than the former and is defined dew-point. By boiling temperature it is meant the bubble point above defined. It has been surprisingly found that minimum azeotrope object of the present invention has refrigerating and heating performances better than average linear ones calculable from those of the pure components. The near-azeotropic compositions comprise the azeotropic one and have been shown by isobar measurements at p=1 atm (101 kPa). The azeotropic and near-azeotropic compositions of the invention have moreover a remarkable industrial interest since they unexpectedly show refrigerant capacity better than or similar to those of R 22, combined with COPs similar to those of R 22.

Furthermore it has been found that the compositions of the invention show a very good solubility at any temperature higher than −30° C. with the polyol esters which are the most common alternative lubricants to hydrocarbon oils (mineral and synthetic) and to alkylbenzenes. This solubility feature is essential to assure the oil return to the compressor and avoid inconveniences in heat transfer due to oil accumulation in the evaporator. Besides, the compositions of the invention show to have the required characteristics as regards inertia and chemical compatibility in general. They indeed, once dissolved in POE and put into prolonged contact and at high temperature with the metals which usually are part of the air-conditioning unit, do not undergo chemical alteration nor cause chemical attack to the metals and neither generate chemical alteration to the lubricant in an extent higher than that caused by R 22 in the same conditions. This according to the ASHRAE 97-1983 (RA 89) method. In general the compositions with oil comprise a refrigerant fluid amount ranging from 35 to 99% by weight and oil from 1 to 65% by weight.

Among the near-azeotropic fluids, those having an R 32 content lower than 50% by weight are characterized by a vapour pressure similar to that of R 22 and by the non flammability.

It has been found that it is possible to add a third component to the binary compositions of the present invention without modifying the near-azeotropic behaviour. For instance R 125 or R 143a can be added in the following compositions:

R 32 35–95% by weight

RE 125 3–63% by weight

Third component 2–50% by weight.

In particular the following compositions:

R 32 35–50% by weight

RE 125 3–63% by weight

R 125 2–47% by weight have resulted non flammable. This is an useful property in the case of leaks since the composition never becomes flammable.

The examples reported hereinafter are only illustrative and are not limitative of the purpose of the present invention.

EXAMPLE 1

In Table 1 the main characteristics of the pure components which concur to the formation of the near-azeotropic compositions and to the azeotropic one of the present invention are reported. For completeness with respect to what said in the background of the invention the same characteristics are reported also for refrigerant fluid R 22.

TABLE 1

| Characteristics | $CH_2F_2$ | $CHF_2$—O—$CF_3$ | R22 |
|---|---|---|---|
| Molecular Weight | 52.0 | 136.02 | 86.50 |
| Boiling temperature (° C.) (101.325 kPa) | −51.6 | −35.09 | −40.8 |
| Critical temperature (° C.) | 78.2 | 81.3 | 96.1 |
| Critical pressure (kPa) | 5795 | 3351 | 4988 |
| Evaporation Heat (kJ/kg a 101.325 kPa) | 387.4 | 152.7 | 233.3 |
| Flammability in air | 12.7–33.5% v/v | not flam. | not flam. |
| Toxicity | 1000 (AEL*) | 1000 (A-EL*) | 1000 (TLV) |
| Ozone Depletion Potential (CFC 12 = 1) | 0 | 0 | 0.055 |
| Average lifetime (years) | 6.2 | 21 | 15.8 |

*Values suggested by the producers

The mixture of known composition and weight, is introduced in a small glass cell, previously evacuated, having an internal volume equal to about 20 $cm^3$, equipped with metal connections, valve for the feeding and with a pressure transducer to evaluate the system vapour pressure. The filling volumetric ratio is initially equal to 0.8% by volume. The glass container is introduced in a thermostatic bath of viscosimetric type with double window for the internal observation. The constancy of the thermostatic bath was estimated to be within +/−0.01° C. in the examined working field. The temperature is slowly changed until obtaining an equilibrium value of the vapour pressure equal to 1.01 bar. The corresponding temperature is recorded and represents the mixture boiling temperature at the pressure of 1.01 bar. The temperature is externally measured with a thermometer whose accuracy is equal to +/−0.01° C.; particular attention was paid so that the external temperature measured in the bath is really the internal one of the cell. By varying the mixture composition it is possible to evaluate possible deviations with respect to the ideality and it is therefore possible to identify the azeotropic composition which, as said, will be characterized by an absolute minimum. In Table 2 the boiling temperatures (Tb) measured for each single fraction of difluoromethane ($CH_2F_2$) and of 1,1,1,2,2-pentafluorodimethylether ($CHF_2$—C—$CF_3$) at the constant pressure of 1.01 bar are reported.

TABLE 2

| Fraction by wt. ($CH_2F_2$/$CHF_2$—O—$CF_3$) | Bubble temperature, Tb (° C.) |
|---|---|
| 1/0 | −51.7 |
| 0.9/0.1 | −51.8 |
| 0.8/0.2 | −51.7 |
| 0.7/0.3 | −51.5 |
| 0.6/0.4 | −51.2 |
| 0.5/0.5 | −50.7 |
| 0.4/0.6 | −50.0 |
| 0.3/0.7 | −48.8 |
| 0.2/0.8 | −46.8 |
| 0.1/0.9 | −43.1 |
| 0/1 | −35.1 |

EXAMPLE 2

In order to confirm the azeotropic or near-azeotropic behaviour, the mixture characterized by a minimum in the boiling temperature and others identified in the range of the azeotrope were subjected to the evaporation test at the constant temperature of the azeotrope.

The content of the cell described in Example 1 is removed at constant temperature by evaporation until having a loss corresponding to 50% by weight of the initial amount.

From the evaluation of the initial and final pressure the percent variation of the vapour pressure is calculated: if the decrease is equal to zero the mixture in those conditions is an azeotrope, if the decrease is < about 10% its behaviour is of a near-azeotrope. It is obvious that a near-azeotropic mixture will have a behaviour closer and closer to a true azeotrope if the % variation is lower and lower and near to zero.

The results are reported in Table 3.

TABLE 3

| Composition (% by wt.) | Temperature (° C.) | Vapour pressure (bar) | Δp/p × 100 |
|---|---|---|---|
| R-32/E125 (90) - (10) | −51.8 | 1.01 | 0.00 |
| R-32/E125 (85) - (15) | −51.8 | 1.01 | 0.99 |
| R-32/E125 (40) - (60) | −51.8 | 0.93 | 9.68 |
| R-32/125/E125 (54) - (40) - (6) | −51.8 | 1.02 | 0.98 |

EXAMPLE 3

The azeotropic composition $CH_2F_2$/$CF_3$—O—$CHF_2$ (90/10) was subjected to the chemical stability test reported in the ASHRAE 97-1983 (RA 89) method with some not substantial differences described hereinafter.

In a cylindric glass tube, having a diameter of 4.5 mm and an height of 250 mm, two copper and steel metal samples and 1 cm³ of lubricant, polyol ester SW 32 degree by Casrrol Spa, were introduced. The tube is then inserted in a steel cylinder fitted to exactly contain it, valve-equipped.

The cylinder is evacuated and cooled, then the refrigerating mixture (1 ml) is introduced; the cylinder is closed and put in a stove at 175° C. for 14 days.

Likewise other two samples, the former containing the near-azeotropic composition $CH_2F_2$/$CF_3$—O—$CHF_2$ (80/20) and the latter containing R 22 as reference were charged in the stove.

After 14 days, the test tubes were opened, cooled to room temperature and the fluid was collected by evaporation in a samples-holder for the gaschromatographic analysis. Such analysis had the purpose to verify the formation of by-products from the fluid itself or of light products coming from the lubricant degradation. The lubricant was then submitted to titration with KOH for determining the possible acidity and to a visual analysis for the possible colouring change. The metal samples were submitted to visual examination to point out possible opacity or corrosion. The evaluations were carried out by considering as reference a system formed by R 22/alkylbenzene oil/metals.

The results are reported in Table 4.

TABLE 4

| | Oil | | | | Metals: | |
|---|---|---|---|---|---|---|
| | | | | (°) Acidity before/ | Visual Evalualation | |
| Fluid | Oil | Metals | Colour | after | Copper | Steel |
| $CH_2F_2$ + $CF_3$—O—$CHF_2$ (90/10) | POE* | copper/ steel | yellowing | 0.08/0.10 | opaque | unaltered |
| $CH_2F_2$ + $CF_3$—O—$CHF_2$ (80/20) | POE* | copper/ steel | yellowing | 0.08/0.13 | opaque | unaltered |
| R 22 | AB** | copper/ steel | yellowing | 0.01/0.02 | opaque | unaltered |

| Gaschromatographic analysis to detect the formation of by-products due to the test | |
|---|---|
| Fluid | By-products, % wt. |
| $CH_2F_2$/$CF_3$—O—$CHF_2$ (90/10) | <0.01 |
| $CH_2F_2$/$CF_3$—O—$CHF_2$ (80/20) | <0.01 |
| R 22 | <0.01 |

(°) mg KOH/g oil
*Ester oil Castrol Icematic ® SW32
**Alkylbenzene oil Esso Zerice ® S32

EXAMPLE 4

The lubricating oil was introduced in a glass test tube with thick walls, resistant to high pressures, and closed at an end by a metal valve. After cooling the refrigerating mixture was introduced in the previously evacuated test tube which was then dipped in a thermostatic bath. The temperature was first slowly increased from 25° C. to 40° C. and then, always slowly, was decreased to −70° C. in order to identify possible oil unmixing temperatures which usually show themselves by a transition from a clearness situation to an opacity one (cloud point). In the following Table 5, for increasing lubricant/fluid ratios, the temperatures below each of them the solubility, for each considered lubricant/fluid ratio, disappears to give rise to two mutually unsoluble phases, are reported. Below the temperatures indicated in Table 5, for each lubricant/fluid ratio, a zone of uncomplete solubility said "zone of the critical temperatures of superior solution" is therefore defined. No solubility lacuna, like that above mentioned, was noted at temperatures higher than 0° C. and up to 40° C. The lubricants used are Icematic® SW32 by Castrol SpA and Zerice® S32 by Esso; the latter is the traditional reference system for R 22. From the examination of Table 5 it results that the two examined mixtures are soluble in the lubricant at least up to a lubricant/mixture ratio in the range of 60% provided that the −22° C. up to at least 40° C. are exceeded. Such solubility is certainly sufficient to assure the coming back of the lubricant to the compressor and to avoid the accumulation thereof in the heat exchangers in the foreseen working conditions.

TABLE 5

| FLUID | OIL | Concentration oil % wt. | Critical solution temperature, ° C. UCST* | LCST** |
|---|---|---|---|---|
| $CH_2F_2/CF_3$—O—$CHF_2$ (90/10) | POE° | 4.7 | −39.3 | >40 |
| | | 10.3 | −25.8 | >40 |
| | | 19.8 | −22.5 | >40 |
| | | 28.9 | −22.3 | >40 |
| | | 41.1 | −25.2 | >40 |
| | | 50.4 | −32.1 | >40 |
| | | 59.8 | −44.4 | >40 |
| $CH_2F_2/CF_3$—O—$CHF_2$ (80/20) | POE° | 5.1 | −41.3 | >40 |
| | | 9.9 | −27.6 | >40 |
| | | 20.2 | −24.4 | >40 |
| | | 30.1 | −23.8 | >40 |
| | | 39.8 | −27.7 | >40 |
| | | 51.2 | −34.1 | >40 |
| | | 60.4 | −46.3 | >40 |
| R 22 | AB°° | 4.8 | <−70 | >40 |
| | | 7.6 | −68.9 | >40 |
| | | 10.1 | −67.2 | >40 |
| | | 12.6 | −67.5 | >40 |
| | | 15.0 | −68.3 | >40 |
| | | 25.0 | <−70 | >40 |
| | | 30.0 | <−70 | >40 |

*Critical solution temperature (solubility lacuna at low temperature)
**Critical solution temperature (solubility lacuna at high temperature)
°Ester oil Castrol Icematic ® SW32
°°Alkyl benzene oil Esso Zerice ® S32

EXAMPLE 5

In Table 6 performances of all difluoromethane ($CH_2F_2$) and 1,1,1,2,2,-pentafluorodimethylether ($CHF_2$—O—$CF_3$) compositions which comprise also those near-azeotropic and, among them, that azeotropic, are reported. Values reported in Table 6 have been calculated. The following conditions for a climatization cycle with heat pump were set up:

Condensation temperature=30° C. (inlet)
Evaporation temperature=−20° C. (outlet)
Overheating=15° C. (excluded from the calculation of COPs and Qvs)
Undercooling=0° C.
Isoentropic compression efficiency=100% (ideal).

In Table 6 the refrigerating cycle and the heat pump cycle are indicated with the abbreviations r, hp respectively (r=refrigerating cycle, hp=heat pump). The refrigerating or heating volumetric capacity (Qv(r), Qv(hp)) conditions the power, the volume sucked from the compressor being the same: to obtain equal power levels with lower volumetric capacities it is necessary to replan and increase the efficiency of the compressor and/or replan and increase the efficiency of the heat exchangers with remarkable increases of the cost of the climatization unit. The two COP values (COP(r) and COP(hp)) are also important as they express the electric power used by the climatization unit to obtain equal levels of refrigerating or heating power: this value is destined to be taken more and more into consideration as connected with the single countries national plans relating to the energy saving and to the lower environmental impact (global warming). The values of the overheating temperature due to the compression (T compressor outlet, Toc) must be sufficiently low and such as not to compromise the chemical stability of the fluid, the chemical resistance of the materials in the hot part of the compressor and the seal of the relative gaskets: it is known to the skilled that the composition 2, listed in Table 6, shows an acceptable Toc deviation based on that of R 22. The composition 1 involves a difference of about 15° C. which is high but not so much as to form a negative important element in the judge of very good performance associable to such composition.

The pressure values at the condensation are high for some fluids of Table 6 but they are not excessively binding considering that the application field is directed to the new equipments whose plan can provide without excessive costs for a good seal to the pressure of all the unit elements.

It is noted that while the COP (r) and COP (hp) values of the compositions 1 and 2 are lower than those of R 22 of less than 2%, the Qv(r), Qv(hp) values are higher than at least 5%.

BRIEF DESCRIPTION OF DRAWINGS

It is noted in FIG. 1 that the COP values of the compositions 1 and 2 are surprisingly higher than those corresponding to the linear average value among those of the components (broken line). The same occurs for the Qv values as reported in FIG. 2.

TABLE 6

Figure 1:
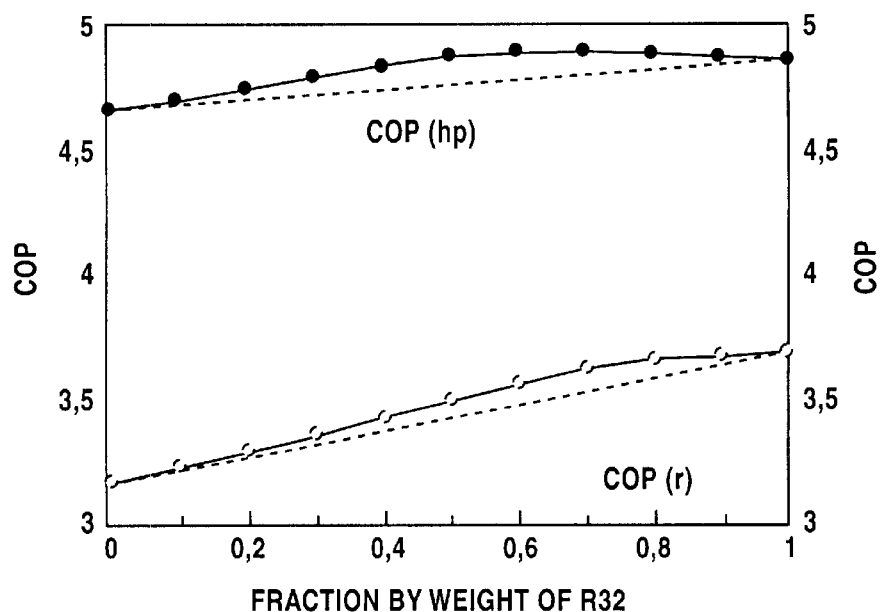
Figure 2:
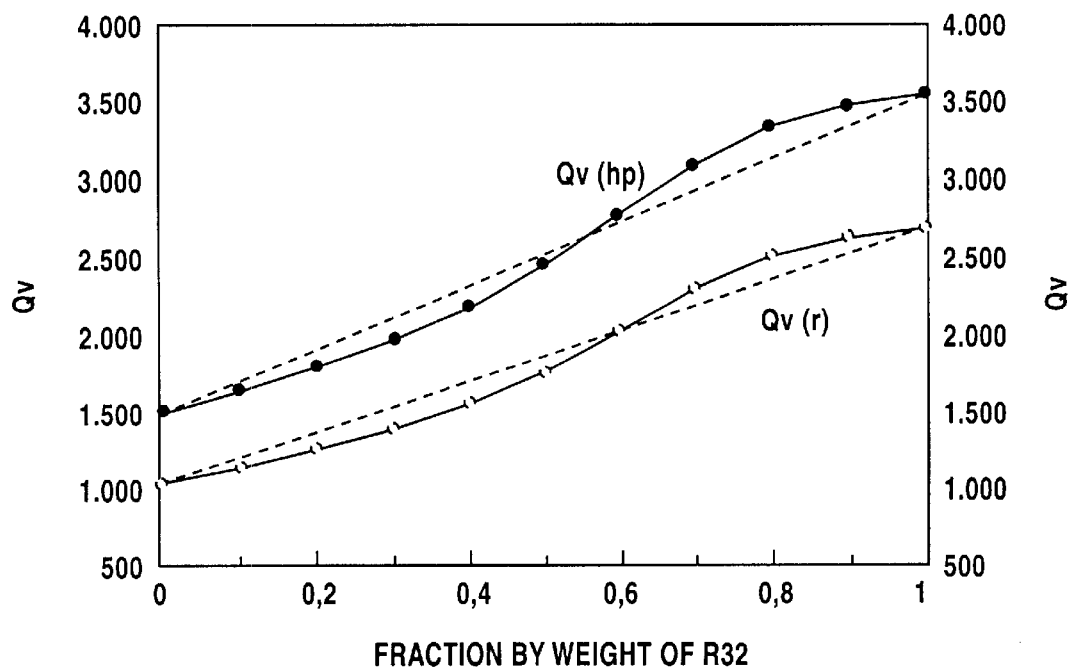

| Fluid No. | Com-position | COP (hp) | COP (r) | Qv (hp) (kJ/m³) | Qv(r) (kJ/m3) | P cond. (kPa) | P evap. (kPa) | Toc (° C.) |
|---|---|---|---|---|---|---|---|---|
| 1 | R 32/RE 125 (90/10) | 4.87 | 3.68 | 3495 | 2644 | 1911 | 404 | 89.1 |
| 2 | (80/20) | 4.88 | 3.67 | 3359 | 2522 | 1868 | 398 | 80.2 |
| 3 | (70/30) | 4.89 | 3.63 | 3111 | 2307 | 1780 | 379 | 70.1 |
| 4 | (60/40) | 4.89 | 3.57 | 2781 | 2030 | 1650 | 346 | 61.1 |
| 5 | (50/50) | 4.87 | 3.50 | 2464 | 1772 | 1510 | 310 | 54.5 |
| 6 | (40/60) | 4.83 | 3.43 | 2196 | 1560 | 1383 | 278 | 49.5 |
| 7 | (30/70) | 4.78 | 3.36 | 1975 | 1387 | 1273 | 251 | 45.6 |
| 8 | (20/80) | 4.74 | 3.29 | 1791 | 1244 | 1176 | 229 | 42.3 |
| 9 | (10/90) | 4.69 | 3.22 | 1634 | 1123 | 1088 | 210 | 39.4 |
| 10 | R 32 | 4.86 | 3.69 | 3567 | 2709 | 1931 | 406 | 96.0 |
| 11 | RE 125 | 4.65 | 3.16 | 1499 | 1019 | 1008 | 194 | 36.7 |
| 12 | R 22 | 4.96 | 3.77 | 2151 | 1625 | 1190 | 243 | 74.2 |

R 32 = $CH_2F_2$, RE 125 = $CF_3$—O—$CHF_2$

What is claimed is:
1. A method for heating or cooling an object according to the Rankine cycle comprising employing a working fluid, admixed with a polyol ester oil, said working fluid having the following composition:
R 32 35–50% by weight
RE 125 3–63% by weight and
R 125 2–47% by weight
said working fluid is a drop-in replacement for R22.

* * * * *